United States Patent [19]

Schriver, Jr.

[11] Patent Number: 4,681,691

[45] Date of Patent: Jul. 21, 1987

[54] MOLDABLE COMPOSITION

[75] Inventor: Harold S. Schriver, Jr., York, Pa.

[73] Assignee: AMP Incorporated, Harrisburg, Pa.

[21] Appl. No.: 735,418

[22] Filed: May 17, 1985

[51] Int. Cl.$^4$ .............................................. F16C 33/12
[52] U.S. Cl. .................................... 252/12; 252/12.2;
  252/58; 252/49.6; 264/242; 439/130; 439/274
[58] Field of Search ....................... 252/12, 12.2, 49.6,
  252/58; 264/242; 339/94 R, 94 M

[56] References Cited

U.S. PATENT DOCUMENTS

| | | | |
|---|---|---|---|
| 3,344,064 | 9/1967 | Brady et al. | 252/12 |
| 3,445,393 | 5/1969 | Hinds | 252/58 |
| 3,808,130 | 4/1974 | Schiefer et al. | 252/12 |
| 4,116,920 | 9/1978 | Honma et al. | 252/12 |

OTHER PUBLICATIONS

R. E. O'Sullivan; "Bloom In Compounds of Neoprene," Publication #NP 590.2 of Du Pont, 5 pages.

*Primary Examiner*—Jacqueline V. Howard
*Attorney, Agent, or Firm*—Katherine A. Nelson

[57] ABSTRACT

A moldable composition for use in making sealing members for articles is disclosed. The composition is a mixture of a major amount of an elastomeric material, an amount of filler at least 30 parts per hundred by weight of said elastomeric material, a sufficient amount of catalyst to polymerize said elastomeric material and an amount of oil between 2.5 and 20 parts per hundred by weight of said elastomeric material said oil being incompatible with said elastomeric material. Surface portions of said sealing members have inherent lubricity thus lowering the coefficient of friction of said members.

17 Claims, 11 Drawing Figures

MOLDABLE COMPOSITION

FIELD OF THE INVENTION

This invention relates to a moldable composition, and in particular to compositions that can be molded to form seals for electrical connectors and the like.

BACKGROUND OF THE INVENTION

Seals for electrical connector assemblies are known. These seals include interfacial seals to sealingly engage mating connectors in connector assemblies, and environmental sealing arrangements to seal and securely retain insulated cables of individual terminated conductors within a connector body. For instance, U.S. Pat. No. 4,150,866 discloses a connector having a dielectric body with a plurality of contact-receiving cavities therein. A like plurality of insulated conductor wires with terminals thereon is inserted through individual elastomeric seals, and with the contacts secured in the forward ends of the cavities the seals sealingly grip the respective insulated coverings of the conductors and also sealingly engage side walls of the cavities at the rear of the connector body. With the particular shape of the seals, the seals are said to allow easy replacement of the contacts and to provide a wiping action between both the seal and connector and the seal and conductor to assure removal of any dirt or debris at the rear of the connector during removal of the contact, keeping the cavity clean.

Sealed connector assemblies find especial application where electrical connections are exposed to adverse environmental conditions either during performance or during servicing and repair of the connector or both. Adverse environmental conditions could include incidental water spray, high-nozzle-velocity water spray or steam such as during periodic cleaning, high humidity, and dust or debris. Typical uses for such a sealed connector would be in an electrical system for an agricultural tractor (where spray cleaning, dust and weather are involved) or air conditioner ducts (where high humidity is involved). It is foreseeable that such a connector assembly would need to be servicable in the field in that one of the contacts may need to be replaced in the connector. It is also foreseeable that an entire assembly may need to be applied to conductors in the field and therefore should require as few steps as possible in as simple and quick and effective a procedure as possible.

Such an assembly should have seals which do not provide inhibiting levels of resistance to the insertion of terminated conductors therethrough. Such an assembly should have seals which resist damage when a terminated conductor is being inserted therethrough, such as that which could arise because a terminal may have laterally projecting portions and corners which would tend to tear an elastomeric seal. This tendency would be greater for seals whose surface portions have substantial coefficients of friction.

Typically wire seals such as those discussed above are molded from elastomeric materials. The seals generally require surface lubrication before they are inserted into the connector housings. Additionally some lubrication means is also used before the wires having terminals terminated thereon are inserted into and through the seals. This is usually accomplished by dipping the wire members in a lubricating solution, such as alcohol immediately prior to insertion. The amount of lubrication needed depends upon the coefficient of friction of the insulating material on the conductor wire and the amount of seal surface that is in direct contact with the conductor wire as well as the amount of housing surface encountered by the outside of the wire seal as it is inserted into the connector and seated in its final position. The lubricant used on the outside surfaces is generally petroleum jelly or a mold release composition.

It is desirable to provide wire seals having inherent lubricity, which are capable of receiving terminated conductors having adjacent wire sizes.

The present invention is directed to a moldable mixture for molding sealing articles such as wire seals and annular rings that have inherent lubricity. Thus use of a wire seal molded from the moldable mixture of the present invention eliminates the aforementioned two lubrication steps in the manufacturing process. The inherent lubricity of the internal surface of the wire seal facilitates insertion therethrough of the terminal terminated on the end of the conductor wire. The inherent lubricity of the external surface allows the seals to be inserted into the housing and provides lubricity for any camming member required to deform the seal against the conductors extending therethrough. Furthermore, sealing members made in accordance with the invention can be preassembled into the connector. The end user of the connector need only insert the terminated conductor wires into the preassembled connector thus eliminating separate lubricating steps. The composition can be used to mold wire seals such as those disclosed in U.S. patent application Ser. No. 735,416 entitled *Sealed Electrical Connector*, filed concurrently herewith, U.S. Pat. No. 4,643,506 entitled *Wire Seal* filed concurrently herewith and Ser. No. 735,886 entitled *Wire Seal* filed concurrently herewith.

Annular sealing rings may also be molded from the moldable mixture. Electrical connectors are known which use annular sealing members to provide annular sealing between a plug portion of one dilectric connector housing and a hood or sleeve portion of a second dielectric connector housing therearound. Sealing is accomplished by the sealing member having compressive force applied around the circumference by the hood or sleeve portion being moved axially thereover while the sealing member is upheld by the plug portion underlying the sealing member, thus deforming the member which is of a relatively incompressible elastomeric material. Typically such sealing members are O-rings and tubular sleeves. One such annular sealing member is disclosed in U.S. Pat. No. 4,637,674 entitled *Annular Connector Seal*, filed concurrently herewith. Annular seals molded from the composition as disclosed herein have inherent lubricity and therefore a substantially lower coefficient of friction than compounds used heretofore.

It is known in the molding of articles to use mold release agents to facilitate removal of the molded article from the mold. DuPont Technical Bulletin NP-590.2, "Bloom in Compounds of Neoprene" by R. E. O'Sullivan, is directed toward the phenomenon of bloom in elastomeric compositions. The article states that bloom is primarily considered disadvantageous. One specific advantageous use being made, as the article points out, is the use of mold release agents during in-process molding of a moldable composition. It is not known, however, to produce articles having such blooming after molding and using such blooming advantageously during inservice use of the articles.

SUMMARY OF INVENTION

The molding composition of the present invention is a mixture of an elastomeric material, filler, incompatible oil and a polymerization catalyst. The quantities of the components are given in phr (parts per hundred rubber) which is used herein to mean parts per hundred by weight of elastomeric material. The mixture is comprised of a major amount of an elastomeric material, from about 30 phr to about 60 phr of a filler material, and from about 2.5 phr to about 20 phr of an incompatible oil, and a polymerization catalyst. From about 0 phr to about 10 phr of an incompatible wax may also be added. Typical elastomeric materials include elastomers based on chloroprene, epichlorohydrin, silicone, ethylene/acrylic and the like. The incompatible oil and wax used are determined by which elastomer is used. Possible oils include those such as paraffinic, naphthenic, aromatic and silicone oils. Fillers include carbon black, silica and the like.

In addition up to about 35 phr of one or more of the following additives such as from about 0 phr to about 20 phr processing oils, from about 0 phr to about 2 phr antiozonants, from about 0 phr to about 2 phr antioxidants, from about 0 phr to about 2 phr release agents, from about 0 phr to about 5 phr antidegradents, from about 0 phr to about 3 phr scorch retarders, and from about 0 phr to about 1 phr accelerators for the catalyst if needed, may be added as either aids in manufacturing or agents to increase the life of the articles molded from the composition. Pigments may be added if desired.

The composition of the present invention can be molded into wire seals such as those described above, or annular sealing members such as O-rings and the like. The composition is elastomeric which permits wire seals formed from the composition to expand to allow passage of a variety of sizes and shapes of terminals and wires through the seal, yet recover and fit securely around the wire once the terminal has been inserted completely therethrough and seated in the connector.

The advantages of the present invention will become apparent as the description proceeds when taken in conjunction with the accompanying drawings.

PREFERRED EMBODIMENT

It has been found that the addition of an incompatible oil to a moldable composition used to make sealing members for articles provides the surface portions of sealing members molded from the mixture with inherent lubricity. The composition is made by mixing from about 30 parts by weight per 100 parts of elastomer (phr) to about 50 phr of a filler material, a polymerization catalyst, and from about 8 (phr) to about 12 phr of an incompatible oil. From about 2 phr to about 6 phr of an incompatible wax may also be added. In addition, the preferred embodiment also comprises from about 14.9 phr to about 24.8 phr of the following additives: from 8-12 phr processing oils, from 1-2 phr antiozonants, from 1-2 phr antioxidants, from 0.5-1 phr release agents, from 3-5 phr antidegradants, from 0.4-0.8 phr accelerators, from 1-2 phr scorch retarders. The additives are used as either aids in manufacturing, or agents to increase the life of the articles molded from the composition.

The choice of filler, oils and additives depends upon the elastomer used in the material. Some of the additives determine the tensile, tear strength and durometer of the molded articles.

The quantity of the additives is determined by the physical properties desired in the molded product.

For instance, when the elastomer used was Neoprene-GW (available from DuPont) and the incompatible oil was a paraffinic oil, the mixture was difficult to mold when the amount of oil exceeded 20 phr.

It is believed that moldable compositions producing molded material having a durometer of less than 30 (measured in accordance with ASTM 2240, Shore A) would be unworkable as sealing members. It is also believed that wire seals requiring insertion of a terminated conductor would likely be unsuitable if molded from material having a durometer of 75 or greater because the seal would tear when the terminated conductor was inserted therethrough. Owing to structural features of electrical terminals, the durometer for this type of wire seals is believed to be greater than 50, and preferably 55-65. Material having a durometer greater than 75 could be used for wire seals where the conductor is terminated after it has been inserted into the seal.

It is further believed that the durometer as found in conventional O-ring or annular sealing members should be in the range of 30-95. Annular sealing members or O-rings having a durometer of less than 30 are too soft to hold pressure, however, if the durometer exceeds 95, the seal is too stiff to mate the connectors by practical means.

The coefficient of friction of material molded from the mixture in accordance with this invention is surprisingly and unexpectedly reduced by a factor of 30 in comparison to material made from the same components but without the incompatible oil.

FIGS. 1 to 5 illustrate several embodiments of wire seals made in accordance with invention disclosed herein and used in sealed connector assemblies, said assemblies having camming means therein. The seals illustrated in FIGS. 1-5 are disclosed in U.S. patent application Ser. No. 735,416 entitled *Sealed Electrical Connector* filed concurrently herewith.

Figure 1:
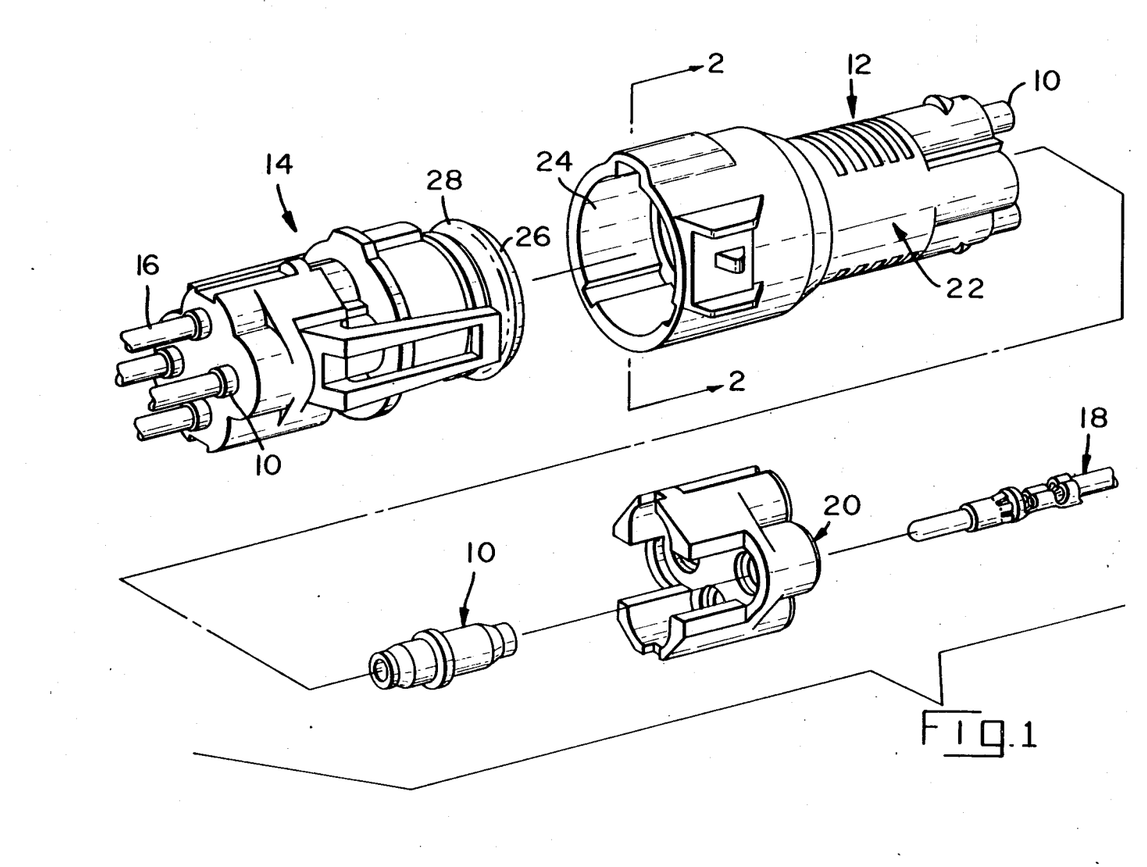
FIG. 1 is a perspective view of a mating pair of sealed connector assemblies with a camming member of one exploded therefrom.

FIG. 1 illustrates wire seals 10 in a mating pair of sealed connectors 12, 14 for a plurality of conductors 16 extending from connector 14 and terminated conductors 18 shown exploded from connector 12. Camming means such as camming member 20 is shown exploded from housing means such as housing 22 of connector 12. Wire seals 10 extend rearwardly fron housing 22 and are preferably molded of an elastomeric material in accordance with this invention.

Figure 2:
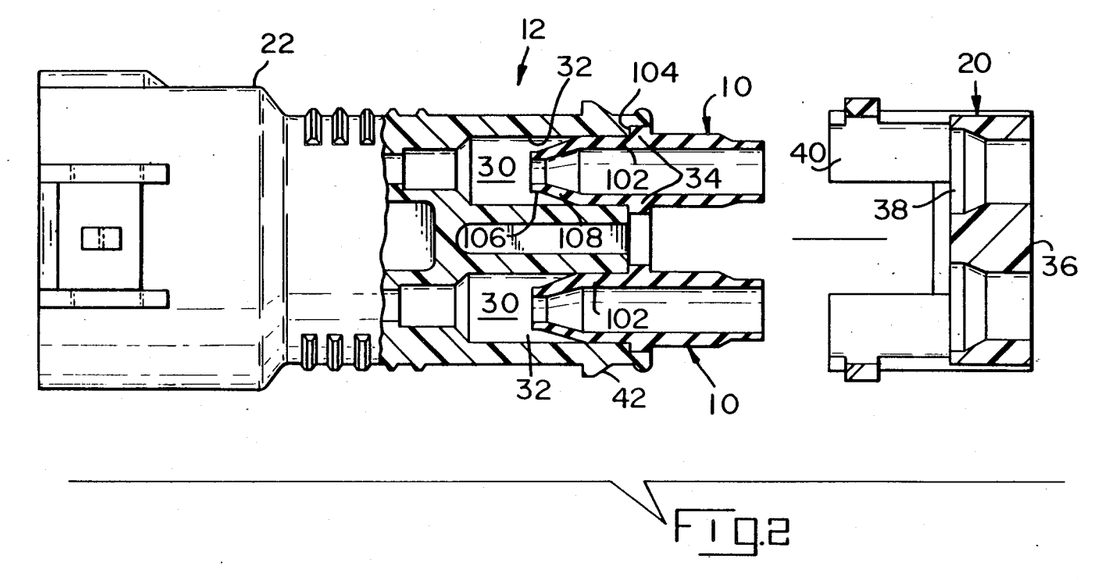
FIG. 2 is a part longitudinal section view of the sealed connector of FIG. 1 with a wire seal positioned in the housing, and the camming member exploded therefrom.

In FIG. 2, camming member 20 is shown exploded rearwardly from housing 22, and wire seals 10 have been placed in rearward or seal-receiving sections of terminal-receiving cavities 30 of housing 22. It is preferred that wire seals 10 have connector-engaging sections 102 which are of a slightly larger diameter than the inside diameter of rearward cavity sections 32, and that wire seals 10 are in interference fit with caavity sections 32 for a preselected distance providing a sealing engagement with the connector, as taught in U.S. Pat. No. 4,150,866. Wire seals also preferably have annular stop shoulders 104 which engage a stop means 34 on the rear surface of housing 22 around respective cavities 30 to stop forward movement of wire seals 10 when inserted thereinto and also later when conductors are inserted thereinto as is described below. It is also preferred, but not essential to the present invention, that wire seals 10 have forward conductor-engaging sections 106 spaced forwardly from connector-engaging sections 102, with frustoconical sections 108 connecting sections 102 an 106, which sections 106 tend to center and hold the conductors in cavities 30 after insertion thereinto as well as sealingly engage the conductors. The inherent lubricity of seals incorporating the herein disclosed invention, facilitates insertion terminals through tight wire seal portions thus reducing the liklihood of tearing the seal. Terminals for terminating electrical conductors typically have portions which are wider than the diameter of the conductor. The seal therefore must expand sufficiently to allow the terminals to pass therethrough. Furthermore, the composition as disclosed herein, eliminates the need for using a separately applied lubricant such as alcohol, inside the seal before the terminals are inserted. Connector 12 can be of the receptacle type having a large forward cavity 24 to receive a plug section 26 of a plug type connector 14 therein, as shown in FIG. 1. Plug connector 14 may preferably have an annular sealing means such as an O-ring 28 seated in a circumferential groove there-around proximate its forward surface to seal circumferentially within large cavity 24. Preferably, the annular seal 28 is also made of the composition as disclosed herein. A preferred embodiment of this seal will be discussed hereafter.

Figure 3A:
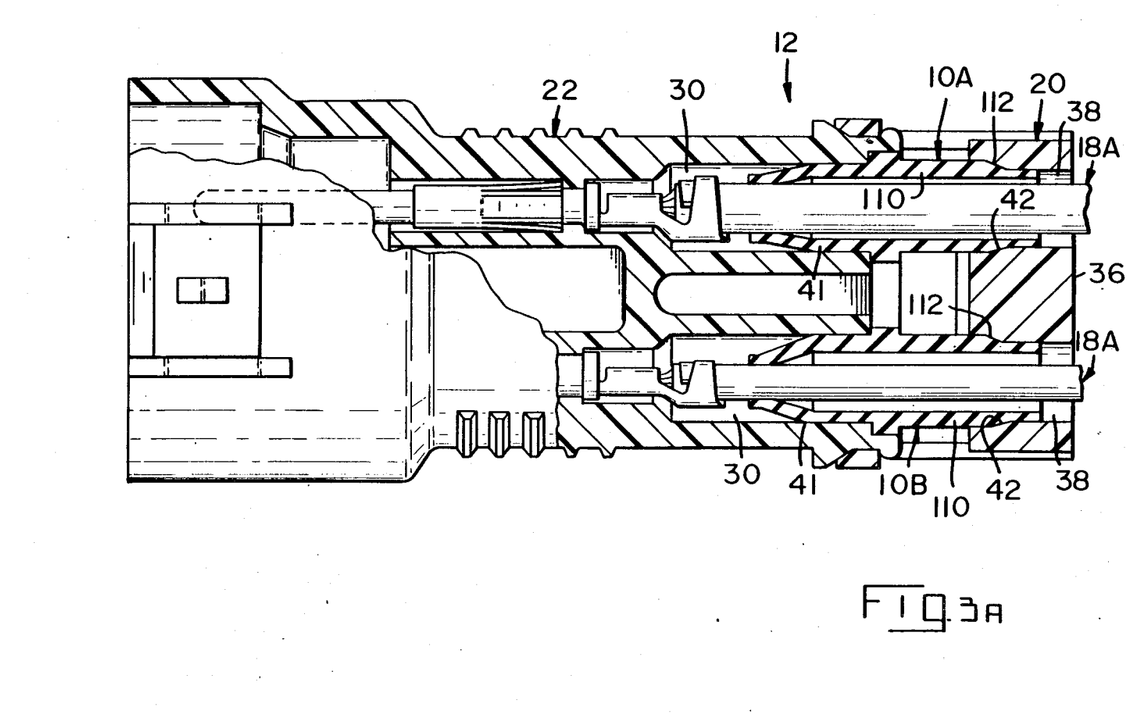
FIGS. 3A and 3B are part longitudinal section views of the assembly of FIG. 2, with large and small size conductors inserted thereinto, the camming member in first and second positions respectively, and a terminal shown secured in a cavity.
Figure 3B:
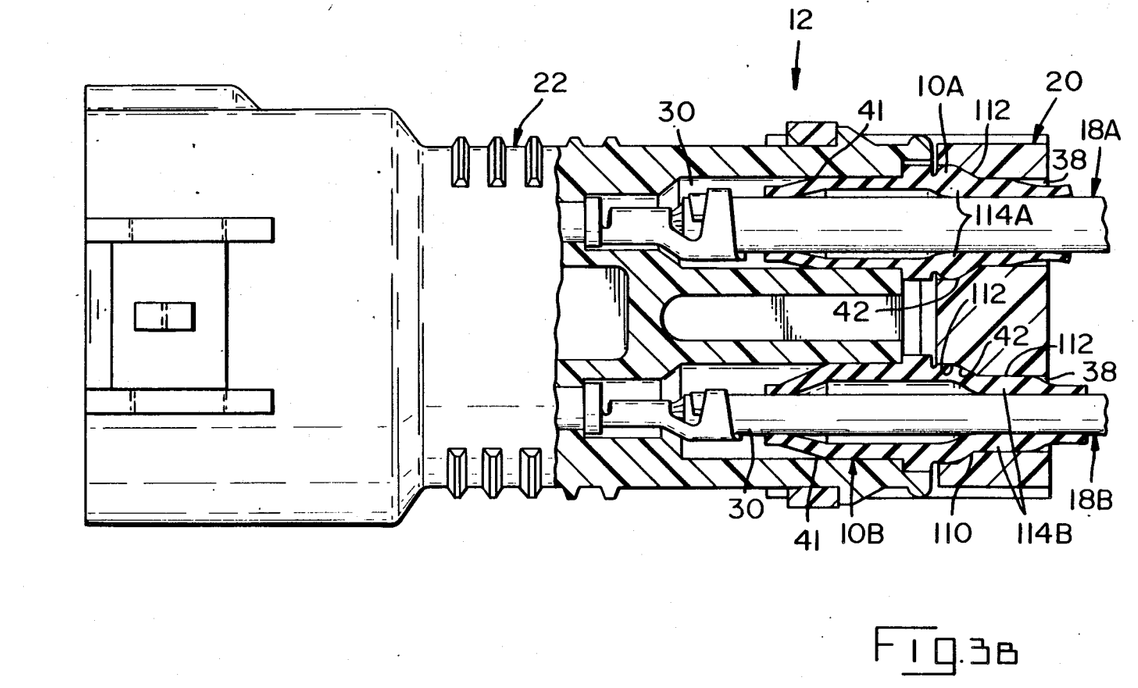

Conventional pin and socket terminals shown in FIG. 1 may be used to terminate respective conductors 16, 18 which electrically engage when connectors 12, 14 are mated, which terminals should be compatible with inserted through a wire seal. Camming member 20 has a transverse section 36 having profiled bores 38 there-through corresponding to terminal-receiving cavities 30 of housing 22. Referring to FIGS. 1 and 2, extending forwardly from transverse section 36 preferably is a collet section 40 within which is received a rearward section 41 of housing 22. In addition collet setion 40 may have an O-ring or other means for sealing with connector housing 22. Preferably camming member 20 may be secured to rearward section 42 of the housing member 22 in a first or open position as well as a second or closed position as is shown in FIGS. 3A and 3B respectively. Camming member 20 is assembled to the rearward section 41 of the housing 22 after the seals 10 have been placed into cavities 30. Terminated conductors are then inserted into respective bores 38 and through the rearward sections 110 of wire seals 10, and into cavities 30 where the terminals are secured in position.

In FIG. 3A, terminated conductors 18A, 18B are shown in place in terminal-receiving cavities 30 of housing 22, with conductor 18A having a relatively large diameter and conductor 18B having a relatively small diameter, which illustrates that the wire seals made in acordance with the present invention may be used with wire diameters of several different sizes. The shape of the seals 10A and 10B after the wire has been inserted will differ slightly depending upon the diameter of the wire. The seal 10A surrounding the larger diameter wire becomes slightly elongated as the wire is passed through it. As is shown in FIG. 3B, the seals 10A and 10B are also deformed somewhat when camming member 20 is moved to its closed position. When camming member 20 is in its first or open position, rearward seal section 110 are disposed in respective profiled bores 38 such that corresponding seal camming surfaces 112 are proximate camming surfaces 42 or even just in engagement therewith.

As is illustrated in FIG 3B, camming member 20 is now moved axially forwardly to its second or closed position. In moving to this closed position, camming surfaces 42 on the walls of bores 38 substantially engage corresponding seal camming surfaces 112 on outside surfaces of rearward sections 110 of wire seals 10A, 10B. Rearward seal sections 110 are deformably urged radially inwardly against the insulated conductors 18A, 18B.

Again, the inherent lubricity of the seals made in accordance with this invention facilitates the camming process by enabling bore camming surface 42 to slide over seal camming surfaces 112 with a reduced coefficient of friction. The coefficient of friction for material made in accordance with this invention is surprisingly and unexpectedly reduced by a factor of 30.

As illustrated in FIG. 3B, the reaction of wire seal 10B around smaller diameter conductor 18B is a relatively simple radially inward deformation 114B, with rearward section 110 sealingly engaging conductor 18B and extending somewhat therealong and possibly rearwardly from transverse section 36 of camming member 20. The reaction of wire seal 10A to larger diameter conductor 18A involves less radial deformation inwardly but substantial deformation 114A forwardly and radially outwardly. The inherent surface lubrication on the inside surfaces of wire seals 10A, 10B made in accordance with this invention and the inherent lubricity molded into said seals enables the wire seals to be deformed as they are engaged with conductors 18A, 18B and the portion of deformation 114A, 114B to move along conductors 18A, 18B to a slight extent, especially to overcome high coefficients of friction of certain types of conductor insulation material.

Figure 4:
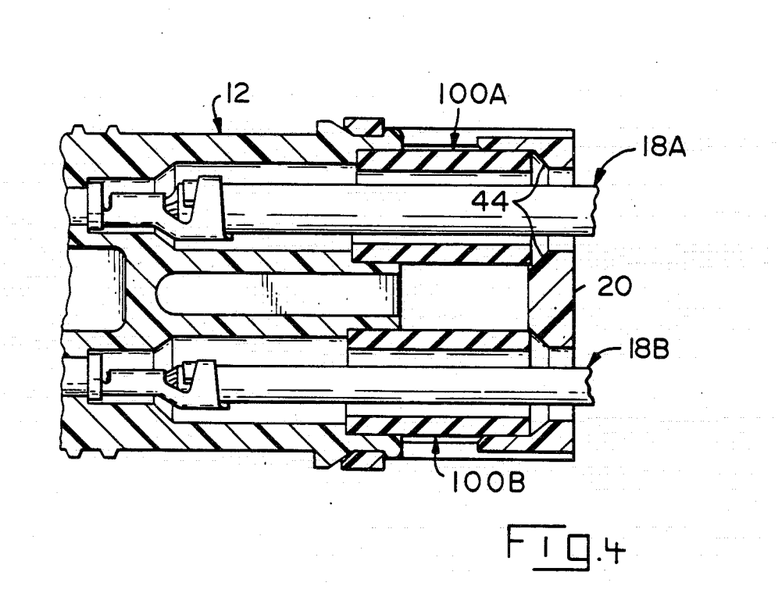
FIG. 4 is a part longitudinal section view of another wire seal embodiment assembled within the housing and camming member.
Figure 5:
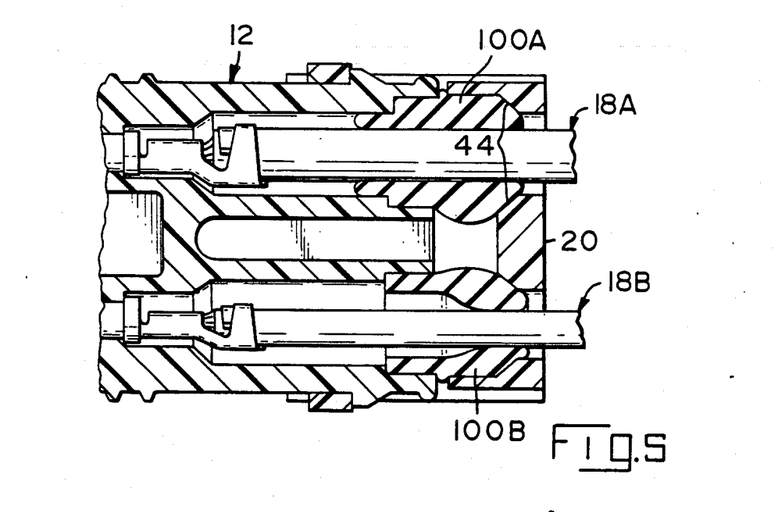
FIG. 5 shows the camming member acting with a third wire seal embodiment with the seal of FIG. 5 around two different sized conductors.

FIGS. 4 and 5 illustrate sleeve-like wire seals 100A and B having a simple sleeve shape used in cooperation with camming member 20. FIG. 4 shows the camming member in its first position, while FIG. 5 shows it in the second position. The inherent lubricity of the seals themselves facilitates the camming process as camming surface 44 moves over and causes deformation of the seals 110A and B as shown in FIG. 5. In addition to facilitating wire seal deformation, the inherent lubricity of the molded wire seal permits preassembly of the seals into the connector housing, since there is no need to apply an external lubricant at the time the wire sleeve are inserted.

Figure 6:
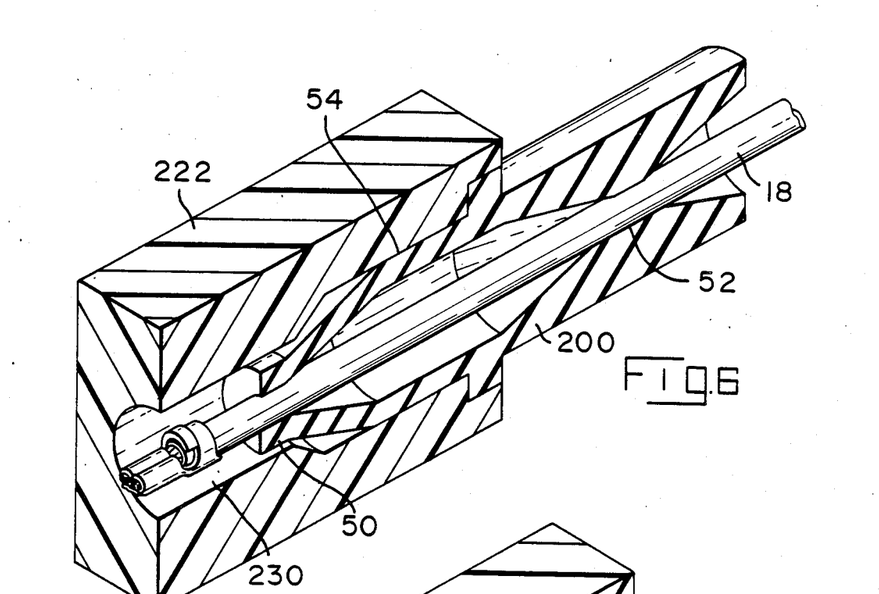
FIGS. 6 and 7 are part longitudinal section views illustrating alternative embodiments of wire seal members in connectors not requiring a camming member.
Figure 7:
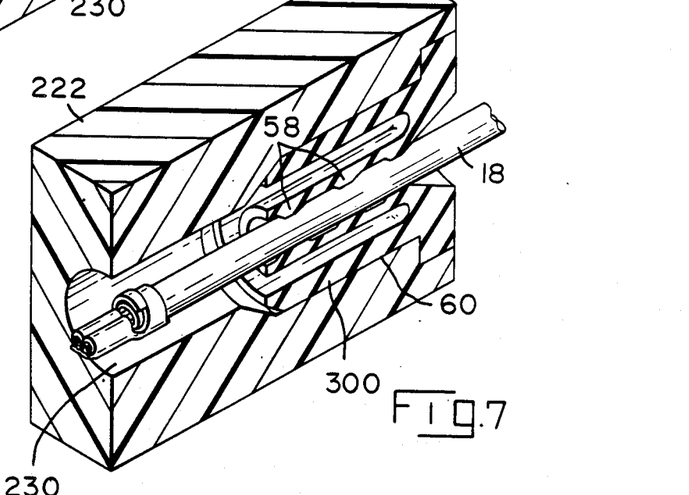

FIGS. 6 and 7 illustrate wire seals 200 and 300 respectively for use in connectors without camming means. Seals of these types are disclosed in U.S. Pat. No. 4,643,506 entitled *Wire Seal* and filed concurrently herewith and U.S. patent application Ser. No. 735,886 entitled *Wire Seal* and filed concurrently herewith. Since there is no external member that forces the seals into tight alignment with the connector housing 222, 322, respectively these seals of necessity must grip the wires 18 tightly and must themselves fit tightly into the terminal receiving cavities 230, 330. The inherent lubricity of the seal is especially important to facilitate insertion of the terminated wire since there is a significant amount of surface contact between the terminal and the seal and especially the wire and seal, and therefore a significant amount of resistance to be overcome, particularly when the conductor insulation material has a high coefficient of friction. It is also important that the molded wire seals have a sufficient resistance to tear to enable the already terminated conductors to be inserted therethrough. This enables preassembly of the seal into the housing. Wire seals of the type shown in FIG. 6 may extend beyond the housing as in FIG. 6 to provide strain relief, and sealingly engage the wire 18 at forward and rearward locations 90, 92 axially spaced from the housing-engaging section 94 of the seal. Wire seals of the type shown in FIG. 7 may be essentially flush with the housing 222 and engage the wire 18 at several closely spaced locations 98 providing redundant sealing, but spaced radially inwardly from the housing-engaging outer section 99 of the seal.

Figure 8:
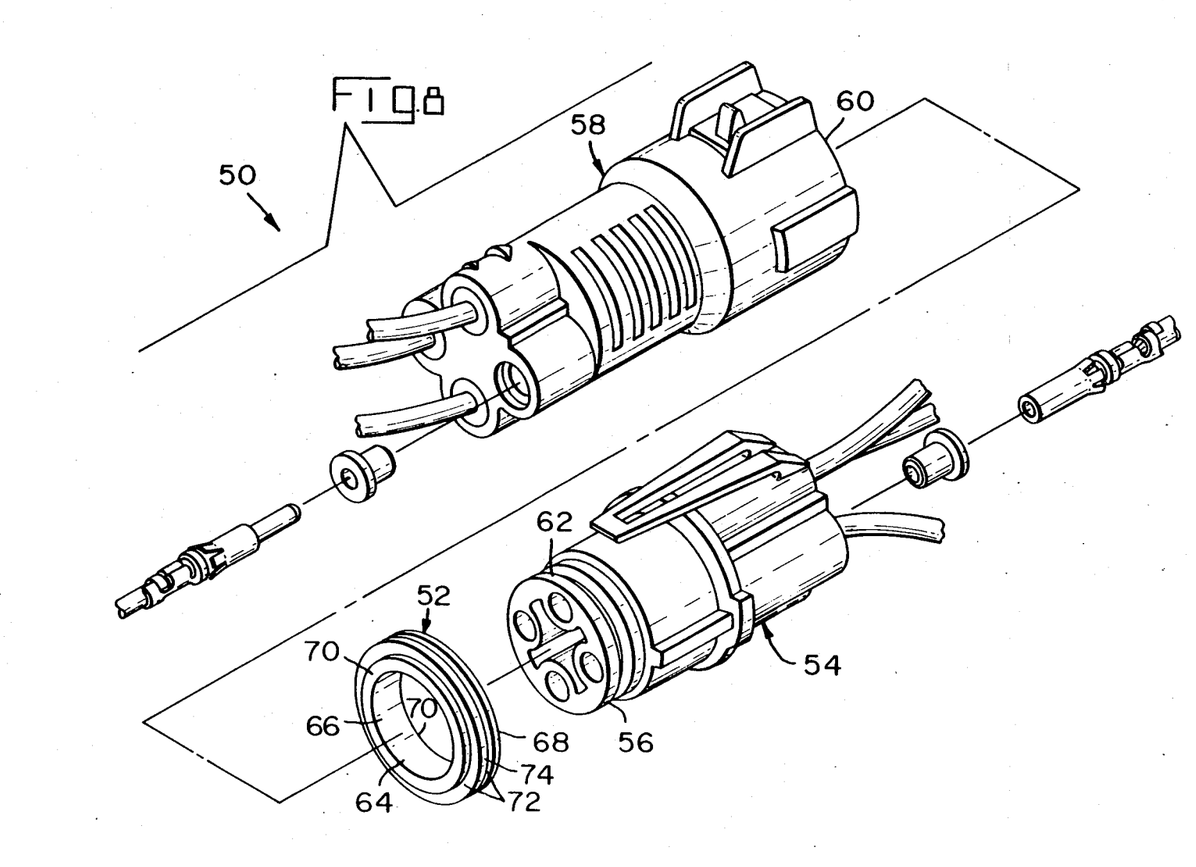
FIG. 8 is an exploded perspective view of a connector assembly utilizing an annular sealing member made in accordance with the present invention.
Figure 9:
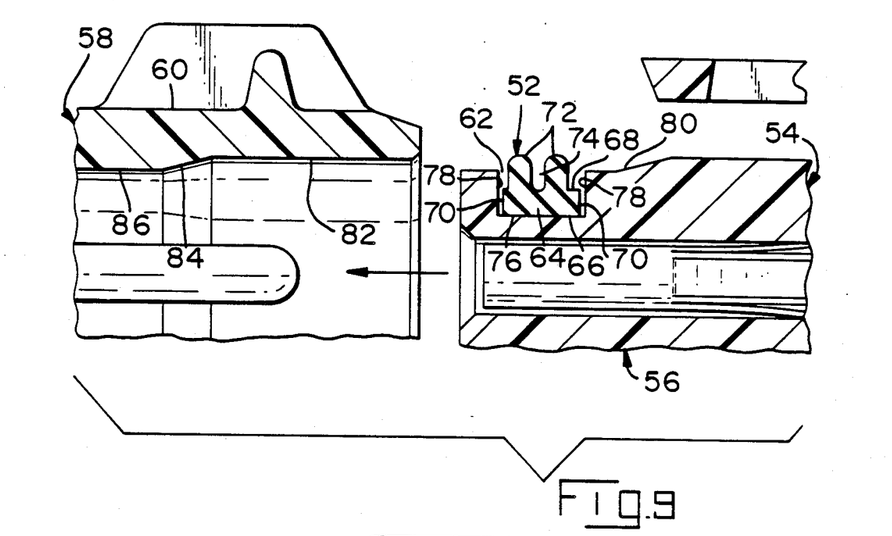
FIGS. 9 and 10 are part longitudinal section views illustrating the unmated and mated connector housings and annular sealing member of FIG. 8.
Figure 10:
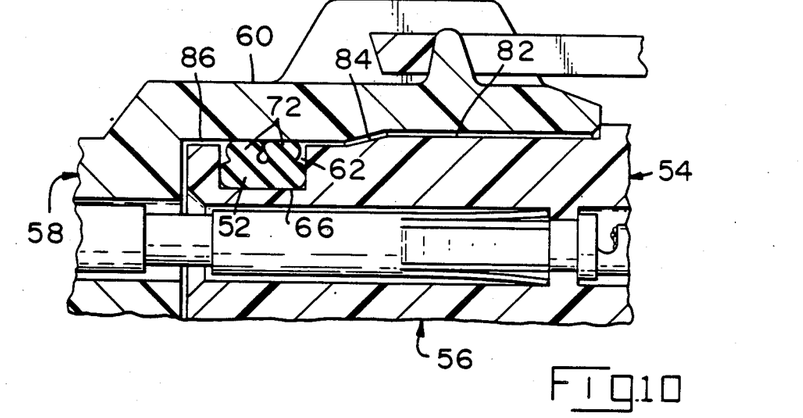

FIGS. 8–10 illustrate a connector assembly 50 having an annular seal member 52 therein. The particular embodiment shown is disclosed in U.S. Pat. No. 4,637,674 entitled *Annular Connector Seal* and filed concurrently herewith. Connector assembly 50 is comprised of a first connector housing 54 having a plug section 56, said plug section 56 having an annular groove 62 therearound, an annular seal member 52 which is sealingly disposed in said annular groove 62 in said plug section 56 and a second connector housing 58 having a sleeve like hood section 60 for axially receiving said plug section 56 of said first housing 54 during axial mating thereof.

The annular seal 52 shown in FIGS. 8–10 has a body section 64 generally rectangular in cross section and an axial dimension of preselected length, coaxial substantially flat inner surface 66, general outer surface 68 and front and rear surfaces 70. A pair of similar annular ribs 72 extend radially outwardly from body section 64 with a gap 74 between ribs 72. The outward extent of annular ribs 72 is determined by the spacing between the inner and outer housings with which the annular sealing member will be used. Body section 64 should have an inner diameter which is substantially equal to the diameter of the plug section of a housing taken through the annular groove thereof within which the annular sealing member will be seated. Body section 64 should extend axially beyond ribs 72 to provide stabiltiy during deformation.

In FIG. 9, annular sealing member 52 is disposed in annular groove 62 adjacent bottom surface 76 thereof. The axial dimension of body section 64 is such as to be preferably slightly less than the width of annular groove 62. Inner surface 66 is preferably snug against substantially flat and coaxial groove bottom 76; body section 64 preferably allows a slight space between front and rear surfaces 70 and groove sidewalls 78; and general outer surface 68 of sealing member 52 is preferably disposed within groove 62 and below general peripheral surface of plug section 56. Annular ribs 72 extend upwardly from groove 62 substantially beyond general peripheral surface 80 to be engaged by an inside surface portion 82 of the hood section 60 of the mating connector housing.

When the connector housing members 54, 58 are mated, plug section 56 enters hood section 60. Ribs 72 of annular sealing member 52 have an appropriately selected radially outward dimension which is based on the difference between the inside diameter of hood section 60 and the outer diameter of plug section 56. The tip sections of ribs 72 are first engaged by forward inner surface 82 of hood section 60 then inwardly tapered inner surface portion 84, and then rearward inner surface 86 of hood section 60 having a reduced diameter from forward inner surface 82; and ribs 72 are urged or bent by frictional engagement with inner surfaces 82, 84 and 86 of hood 60. The inherent lubricity of annular seal member 52 when molded in accordance with the herein disclosed invention, substantially reduces the frictional resistance of surfaces 82, 84 and 86. The primary resistance in mating the housings, therefore is due to deformation of the annular sealing member.

In the drawings and specification, there has been set forth examples of sealing members made in accordance with the invention disclosed herein, and although specific terms are employed, they are used in a generic and descriptive sense only, and not for purposes of limitation.

Examples of the moldable composition of the present invention were made following conventional mixing techniques known in the rubber industry using a Banbury BR mixer available from Farrel Corp., Ansonia, Conn., and a two-roll mill. The elastomer, antidegradant, antioxidant, and antiozonant were first added and the Banbury cycle was begun. Early in the mixing cycle the filler was added after which the processing oil, incompatible oil, release agent and incompatible way were added. Finally during the mixing cycle were added the accelerator, scorch retarder and polymerization catalyst and the mixing process was continued until completion whereby the composition was thoroughly mixed. The mixed material was then placed on a two roll mill and then worked by cutting, folding and compressing for several cycles according to conventional working techniques to homogeneously disperse the various components of the composition. The moldable composition was removed from the mill in a sheet form. Weighed charges of the sheet material are then placed in a mold or in a press and subsequently transferred or injected into the mold.

The following examples illustrate the invention. They are not to be construed as limitations on the instant invention except as indicated in the appended claims. All components are expressed by weight in parts per hundred rubber (phr) except where specifically indicated otherwise.

TABLE 1

| Agent by Function | Material Used | Example 1 | Example 2 | Example 3 | Example 4 |
|---|---|---|---|---|---|
| Elastomer[1] | polychloroprene | 100 | 100 | 100 | 100 |
| Filler[2] | carbon black | 45 | 35 | 35 | 57 |
| Incompatible oil[3] | paraffinic oil | 10 | 2.5 | 5 | 20 |
| Incompatible wax[4] | paraffinic wax | 2 | 5 | 0 | 2 |
| Polymerization catalyst[5] | zinc oxide dispersion | 5 | 5 | 5 | 5 |
| Processing oil[6] | aromatic oil | 10 | 10 | 10 | 10 |
| Antiozonant | mixed diaryl p-phenylenediamine | 2 | 2 | 2 | 2 |
| Antioxidant | dioctylated diphenylamine | 2 | 2 | 2 | 2 |
| Release agent | stearic acid | 0.5 | 0.5 | 0.5 | 0.5 |
| Antidegradant | magnesium oxide dispersion | 4 | 4 | 4 | 4 |
| Scorch retarder | polyethylene glycol | 1 | 1 | 1 | 1 |
| Accelerator | ethylene-thiourea | 0.6 | 0.6 | 0.6 | 0.6 |
| | | 182.1 | 176.6 | 165.1 | 204.1 |

[1]Neoprene GW from E. I. DuPont de Nemours, Wilmington, Delaware
[2]SRF (N762) from Cabot Corporation, Boston, Massachusetts
[3]Sunpar 2280 from R. E. Carroll, Inc., Trenton, New Jersey
[4]Recco 159 from R. E. Carroll, Inc., Trenton, New Jersey
[5]ZIC STICK '85' from Wyrough & Loser, Inc., Trenton, New Jersey
[6]Sundex 790 from R. E. Carroll, Inc., Trenton, New Jersey Sealing members were formed by molding said sheet of moldable composition in mold cavities according to conventional molding techniques, the mold cavities having shapes corresponding to shapes of sealing members shown in FIGS. 1 to 10. In addition test samples were molded in sheet and in button forms according to conventional molding techniques.

Standard tests for tensil strength (ASTM D 412), elongation (ASTM D 412), and tear strength (ASTM D 624) were performed on samples cut from cured sheets. Standard tests for durometer (ASTM D 2240) were performed on molded buttons having a diameter of 1 inch and a thickness of 0.5 inch. The coefficient of friction was determined through the use of a friction/wear machine similar to the Bowden-Liben device decribed in "ASLE Friction and Wear Devices," 2nd Edition, 1976, published by the American Society of Lubrication Engineers. In use, a metallic ¼" diameter hemispherical slider attached to a bearing beam is placed in contact against the elastomeric material which is mounted on a falt carrier. The normal force, by a deadweight scheme, is adjusted to 200 grams. This carrier is driven to produce a reciprocating motion. Strain gages are mounted to the carrier to allow a measurement of the frictional force. The coefficient of friction is the frictional force divided by the normal force:

$$\mu(\text{coefficient of friction}) = \frac{F \text{ friction}}{F \text{ normal}}$$

Table 2 gives the results of tests performed on these samples of the compositions described in Examples 1-5 of Table 1.

TABLE 2

| Property | Test Method | Value | | | |
|---|---|---|---|---|---|
| | | Example 1* | Example 2 | Example 3 | Example 4 |
| Tensile strength, Die C, psi | ASTM D 412 | 2500-2700 | 2800 | 2800 | 2000 |
| Ultimate elongation, % | ASTM D 412 | 530-720 | 670 | 610 | 420 |
| Tear strength, Die C, ppi | ASTM D 624 | 169-218 | 230 | 240 | 140 |
| Hardness, Shore A | ASTM D 2240 | 53-58 | 52 | 53 | 56 |
| Compression set, % Method B, 22 Hours, @ 70° C. | ASTM D 395 | 10-12 | 12 | 11 | 11 |
| Co-efficient of friction, μ ¼" Brass Hemisphere Normal force = 200 grams | Described above | 0.06-0.08 | 0.9 | 0.09 | 0.08 |

*These ae ranges for a plurality of samples molded in accordance with Example 1.

I claim:

1. A moldable composition for use in making bulk deformable sealing members for articles comprised of: a mixture of
    a. a major amount of an elastomeric material;
    b. an amount of filler material at least 30 parts per hundred by weight of said elastomeric material;
    c. an amount of a catalyst sufficient to polymerize said elastomeric material; and
    d. an amount of oil of between 2.5 and 20 parts per hundred by weight of elastomeric material, said oil being incompatible with said elastomeric material;

said moldable composition when molded yielding a test member having a Shore A hardness of between 30 and 95, preferably between 50-65 when measured in accordance with ASTM D-2240, whereby after molding a sealing member from said mixture, said incompatible oil blooms to surface portions of said sealing member resulting in said surface portions of said sealing member having inherent lubricity.

2. The moldable composition as set forth in claim 1 wherein said elastomeric material has a precursor selected from the group consisting of chloroprene, epichlorophydrin, silicone and an ethylene-acrylic copolymer.

3. The moldable composition as set forth in claim 1 wherein said elastomeric material has a chloroprene precursor.

4. The moldable composition as set forth in claim 3 wherein said elastomeric material is neoprene and said incompatible oil is a paraffinic oil.

5. The moldable composition as set forth in claim 1 wherein said mixture is further comprised of an amount of wax of between 0 and 10 phr said wax being incompatible with said elastomeric material.

6. The moldable composition as set forth in claim 4 wherein said mixture is further comprised of an amount of paraffinic was of between 0 and 10 phr said wax being incompatible with said elastomeric material.

7. The moldable composition as set forth in claim 1, wherein said mixture is further comprised of an amount of processing additives between 15 and 26 phr wherein said processing additives facilitate processing and molding of said mixture.

8. The moldable composition as set forth in claim 7 wherein said processing additives comprise one or more of the following: processing oils, release agents, accelerators and scorch retarders.

9. The moldable composition as set forth in claim 1 wherein said mixture is further comprised of an amount of stabilizing additives between 4 and 9 phr wherein said stabilizing additives prolong the in-service life of articles molded from said mixture.

10. The moldable composition as set forth in claim 9 wherein said stabilizing additives comprise one or more of the following: antiozonants, antioxidants, and antidegradants.

11. An assembly comprised of a first and a second article, and a sealing member molded from the composition of claim 1, wherein said sealing member is sealingly disposed between and against said first and second articles and wherein at least one of said first and second articles has surface portions for frictionally engaging respective surface portions of said sealing member during movement therealong, while assembling said first and second articles and said sealing member, whereby said inherent lubricity of said surface portions of said sealing member reduces the coefficient of friction between said article surface portions and said sealing member surface portions.

12. An assembly as set forth in claim 11 wherein said sealing member is a wire seal and said first article is an electrical conductor and said second article is a dielectric housing of an electrical connector for said electrical conductor wherein said sealing member surrounds said eletrical conductor and is disposed in a cavity of said housing wherein a terminated end of said electrical conductors is secured.

13. An assembly as set forth in claim 11 wherein said sealing member is an annular seal and said first article is a first dielectric housing having a forward plug section around which said annular seal is disposed and said second article is a second dielectric housing having a forward hood section for axially receiving said plug section of said first housing during axial mating thereof.

14. A sealing member for an article, said sealing member being bulk deformable and molded from a moldable composition comprised of:
a mixture having:
  a. a major amount of an elastomeric material;
  b. an amount of filler material at least 30 parts per hundred by weight of said elastomeric material;
  c. an amount of catalyst sufficient to polymerize said elastomeric material; and
  d. an amount of oil between 2.5 and 20 parts per hundred by weight of elastomeric material, said oil being incompatible with said elastomeric material;
said moldable composition when molded yielding a test member having a Shore A hardness of between 30 and 75, preferably between 50–65 when measured in accordance with ASTM D-2240; whereby after molding said sealing member from said mixture, said incompatible oil blooms to surface portions of said sealing member resulting in said surface portions of said sealing member having inherent lubricity.

15. A sealing member as set forth in claim 14 wherein said sealing member is a wire seal.

16. A sealing member as set forth in claim 14 wherein said sealing member is an annular seal.

17. A sealing member as set forth in claim 14 wherein said moldable composition is further comprised of an amount of wax of between 0 and 10 phr said wax being incompatible with said elastomeric material. s

* * * * *